United States Patent [19]

Sasaki

[11] Patent Number: 4,899,706
[45] Date of Patent: Feb. 13, 1990

[54] FUEL SHORTAGE DETECTION SYSTEM FOR ENGINE DRIVEN GENERATOR

[75] Inventor: Asao Sasaki, Tokyo, Japan
[73] Assignee: Fuji Jukogyo Kabushiki Kaisha, Tokyo, Japan
[21] Appl. No.: 304,183
[22] Filed: Jan. 31, 1989
[30] Foreign Application Priority Data

Feb. 3, 1988 [JP] Japan .................................. 63-24482

[51] Int. Cl.⁴ .............................................. F02B 77/00
[52] U.S. Cl. .......................... 123/198 D; 123/198 DB
[58] Field of Search ............ 123/198 D, 198 DB, 359, 123/479, 3

[56] References Cited

U.S. PATENT DOCUMENTS 3,659,113 4/1972 Wagner ........................... 123/198 D
3,763,397 10/1973 Yockers ........................... 123/198 D
4,019,489 4/1977 Cartmill .......................... 123/198 D
4,542,718 9/1985 Hurner ............................ 123/198 D Primary Examiner—Noah P. Kamen
Attorney, Agent, or Firm—Beveridge, DeGrandi & Weilacher

[57] ABSTRACT

A system is provided for generating an alarm when the fuel surface level of an engine driven generator becomes smaller than a predetermined value, and stopping the engine after a predetermined time lapse from generating the alarm. Fuel shortage is detected by a fuel caution unit to cause an alarm unit to operate and further cause an engine stop unit to operate. The fuel caution unit causes the engine stop unit to stop after a short time lapse if the engine is restarted after the detection of fuel shortage. The system further includes an oil caution unit, overload caution unit, battery caution unit and power monitor accessories unit.

7 Claims, 10 Drawing Sheets

FUEL SHORTAGE DETECTION SYSTEM FOR ENGINE DRIVEN GENERATOR

BACKGROUND OF THE INVENTION

1. Field of the Invention

The present invention relates to a fuel shortage detection system for an engine driven generator wherein an alarm is generated upon detection of a fuel shortage and the engine is forcibly stopped after a predetermined time lapse.

2. Description of Related Art

If fuel shortage occurs during operation of a diesel engine, air may be introduced into the fuel injection pump to thus make it difficult restart the engine, or cumbersome work to make air draw out becomes necessary.

In case of a gasoline engine, if the engine continues to operate under fuel shortage, the air/fuel ratio becomes lean so that failure of firing may occur, and a problem of exhaust gas contamination may occur.

In Japanese Utility Model Laid-Open Publication No. 62-38475 for example, upon detection of fuel shortage, an alarm is generated to notify the operator of such effect, and if fuel is not supplied before a predetermined time lapse after a timer was made to start operating, the engine is forcibly stopped.

The above prior art has been found unsatisfactory, however, in that the engine can be made to restart within the time limit set by the timer after the engine was forcibly stopped. Therefore, in case of a diesel engine, air becomes likely to be introduced into the fuel injection pump, whereas in case of a gasoline engine, deterioration of exhaust gas constituents may occur.

SUMMARY OF THE INVENTION

The present invention has been made in consideration of the above circumstances. It is therefore an object of the present invention to provide a fuel shortage detection system for an engine driven generator wherein an operator is notified of fuel shortage, and if fuel is not supplied before a predetermined time limit, the engine is forcibly stopped, to thus avoid air introduction into the fuel injection pump in case of a diesel engine and to avoid deterioration of exhaust gas constituents in case of a gasoline engine, and further if the engine is caused to restart under fuel shortage, it is immediately stopped to thus avoid air introduction into the fuel, injection pump and to avoid deterioration of exhaust gas constituents.

According to the fuel shortage detection system for an engine of this invention, a timer is provided at a fuel caution unit for detecting a fuel shortage based on the fuel surface level, which timer starts operating upon reception of a fuel shortage signal and outputs an engine stop signal to an engine stop unit after a time lapse set by the timer, and if the engine is caused to restart, immediately outputs the engine stop signal to the engine stop unit. Further an alarm unit for generating an alarm upon reception of the fuel shortage signal is coupled to the fuel caution unit, to thereby allow immediate stop of the engine if it is made to start under fuel shortage.

BRIEF DESCRIPTION OF THE DRAWINGS

The accompanying drawings show an embodiment of this invention, wherein.

DETAILED DESCRIPTION OF PREFERRED EMBODIMENT

Figure 4:
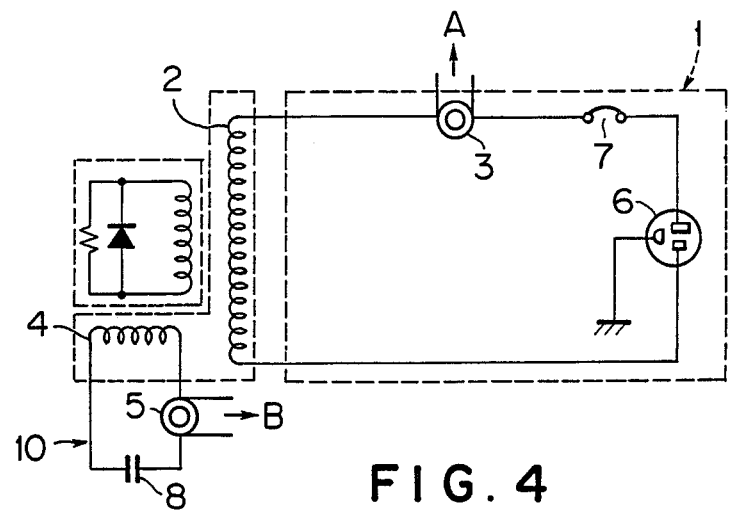
FIG. 4 is a circuit diagram of the generator output circuit.

FIG. 4 shows the circuit arrangement of the main portion of an engine driven generator to which the present invention is applied. In the figure, reference numeral 1 generally designates an output circuit of a diesel engine driven generator. A current transformer 3 is provided for the main winding 2 of the output circuit 1 to detect a current flowing through the winding when a load is connected thereto. Another current transformer 5 is provided for a condenser winding 4 of the output circuit 1 to detect the voltage induced across the winding.

Figure 8:
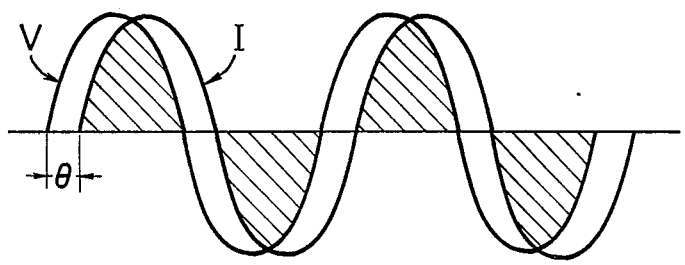
FIG. 8 shows waveforms for illustrating an effective power with voltage and current having a phase difference.

The voltage V and current I of the main winding 2 have a phase difference $\theta$ therebetween, as shown in FIG. 8, depending upon the type of load connected to an AC receptacle 6. The effective power (as indicated by oblique lines in FIG. 8) therefore varies with the phase difference. The effective power Ta is given by $Ta = T \times \cos\theta$ ($T = V \times I$), where T is an apparent power and $\cos\theta$ is a power factor. The current transformer 3 detects only the current I, and the actual effective power supplied from the generator to the load changes when the power factor $\cos\theta$ is other than 1.

The condenser winding 4 on the other hand constitutes an excitation circuit 10 which functions to prevent an output voltage of the main winding from being lowered depending upon the load of the generator. Thus, the excitation circuit 10 may be used as a guide which indicates the apparent power to the load of the generator.

Reference numeral 7 designates an overcurrent protector, and reference numeral 8 designates a capacitor.

Figure 1:
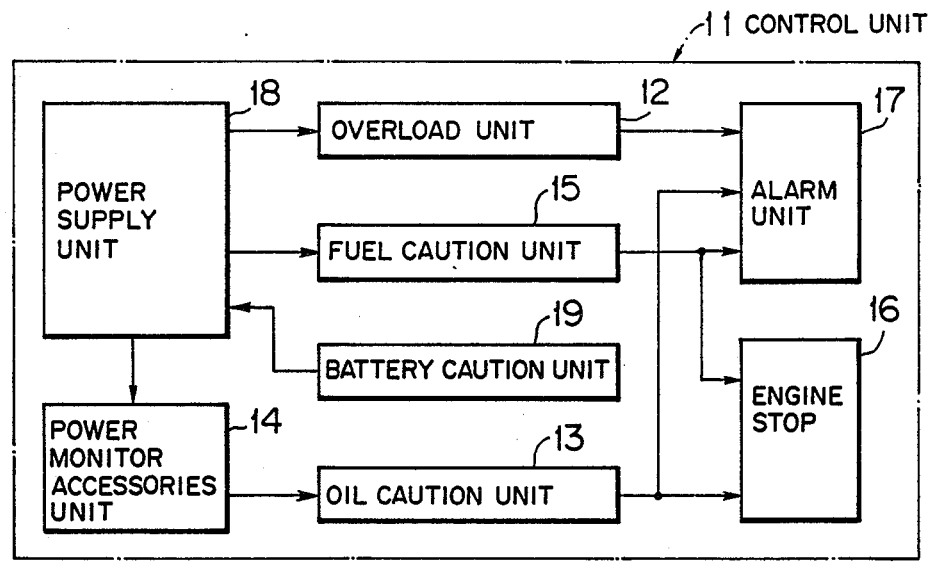
FIG. 1 is a block diagram showing the control units of the system of this invention.

Referring to FIG. 1, a control unit 11 of the generator comprises an overload caution unit 12, oil caution unit 13, power accessories unit 14, fuel caution unit 15, engine stop unit 16, alarm unit 17, power supply unit 18, and battery caution unit 19.

The structures of each control unit will be described in detail.

Structure of Overload Caution Unit 12

The overload caution unit 12 detects the load condition of the engine driven generator based on an output current from the output circuit 1, and displays the load condition under operation on a monitor. The overload caution unit 12 comprises a first load detecting unit A for detecting the load condition by using the main winding 2, and a second load detecting unit B for detecting the load condition by using the condenser winding 4.

Structure of First Load Detecting Unit A

Figure 3A:
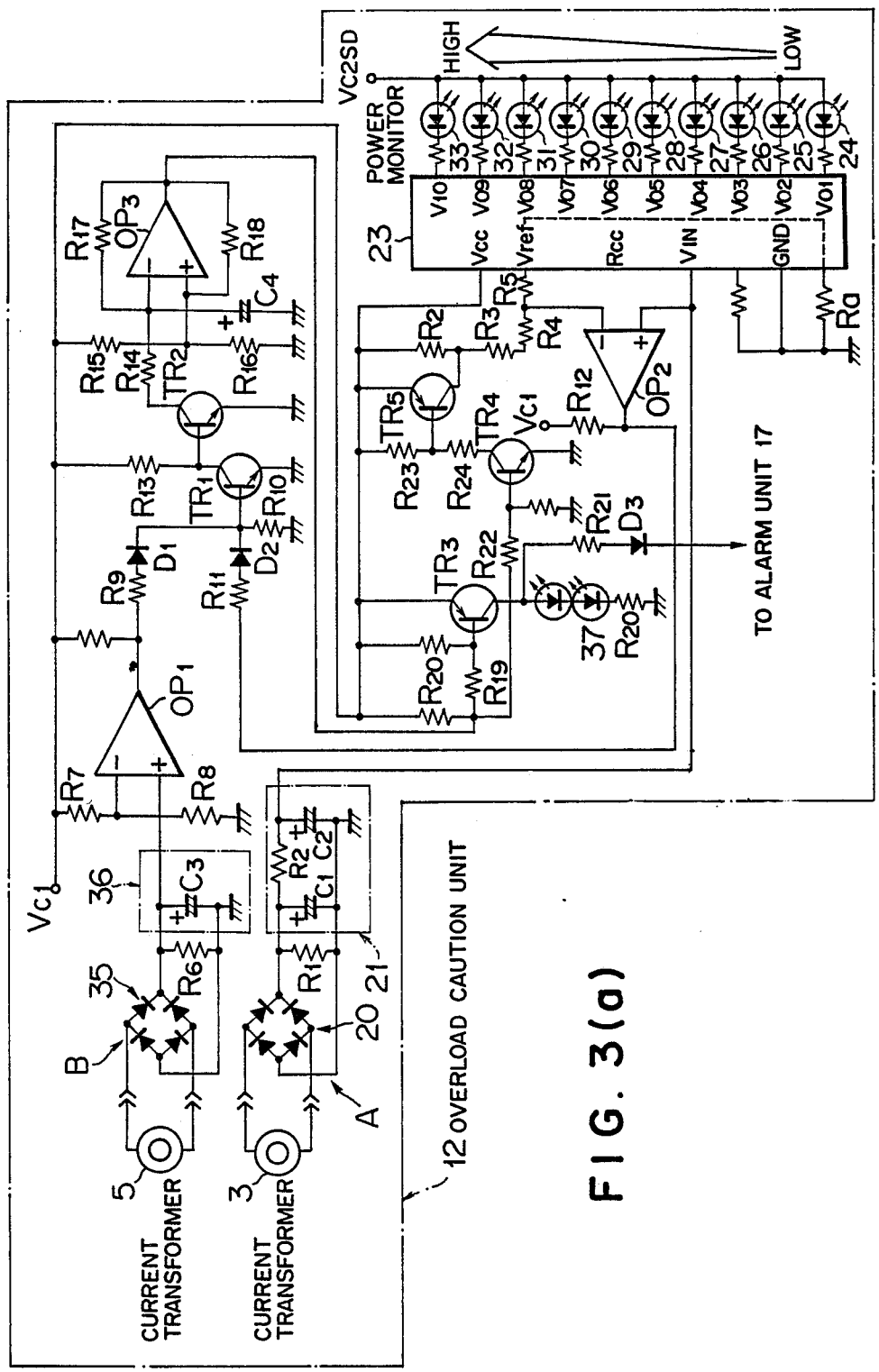
FIG. 3(a) is a circuit diagram of the overload caution unit.

As shown in FIG. 3(a), a current transformer (CT) voltage detected by the current transformer 3 provided for the main winding 2 of the output circuit 1 is full-wave rectified by a rectifier 20 and supplied to a smoothing circuit 21 for smoothing the rectified DC voltage. The smoothing circuit 21 is constructed of resistors R1 and R2 and capacitors C1 and C2. The DC voltage is applied to an input terminal $V_{in}$ of a level meter drive circuit 23.

Output terminals $V_{01}$ to $V_{10}$ of the level meter drive circuit 23 are connected to the cathodes of light emitting diodes (LED) 24 to 33 which are used as a display in this embodiment. A power supply terminal $V_{cc}$ of the level meter drive circuit 23 is supplied with a control voltage $V_{c1}$ which is lower than the battery voltage. A reference voltage input terminal $V_{ref}$ of the level meter drive circuit 23 is supplied with a reference voltage which is determined by a voltage divider constructed of resistors R2, R3, R4, R5 and R6, the control voltage $V_{c1}$ being supplied to the voltage divider.

The anodes of the LEDs 24 to 33 are supplied with a voltage $V_{c2SD}$ which is supplied via a key switch (not shown) from a power supply unit 18 (described later in detail).

Figure 2:
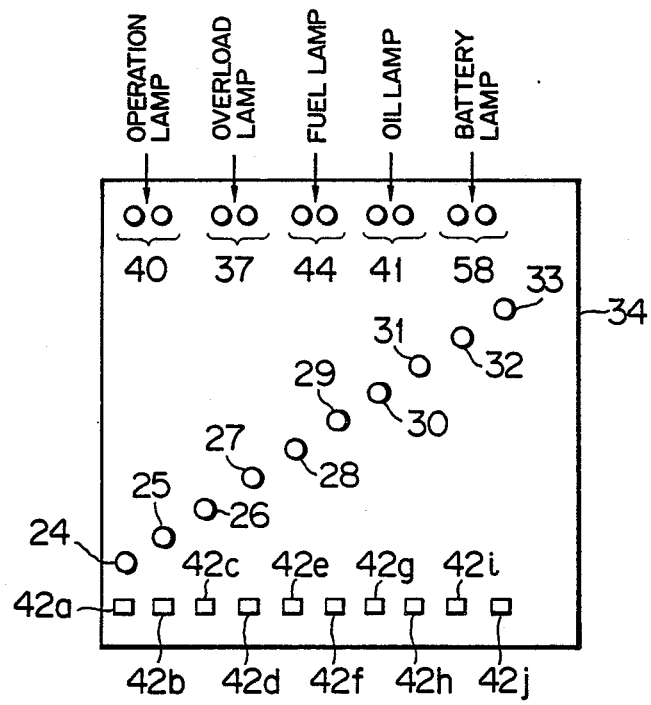
FIG. 2 is a schematic view illustrating the display panel.

The level meter drive circuit 23 compares a voltage inputted to the input terminal $V_{in}$ with the reference voltage inputted to the reference voltage input terminal $V_{ref}$ and causes the LEDs 24 to 33 to turn on sequentially with increasing number of turned-on LEDs from the LOW side to the HIGH side in accordance with the deviation between the compared voltages. The LEDs 24 to 33 are mounted on a display unit 34 of the engine driven generator main body (not shown) with predetermined intervals therebetween along the line from the lower left to the upper right of the display unit as shown in FIG. 2.

Structure of Second Load Detection Unit B

An AC current transformer (CT) voltage detected by the current transformer 5 provided for the condenser winding 4 of the output circuit 1 is full-wave rectified by a rectifier 35 and smoothed by a smoothing circuit 36 made of a resistor R6 and capacitor C3. The rectified and smoothed DC voltage is applied to the non-inverting terminal of a comparator OP1. The inverting terminal of comparator OP1 is supplied with a reference voltage obtained by a voltage divider circuit made of resistors R7 and R8 to which the control voltage $V_{c1}$ (smaller than the battery voltage) is supplied.

The output terminal of comparator OP1 is connected to the anode of a diode D1 via a resistor R9, and the cathode of diode D1 is connected to the base of an NPN transistor TR1 which is grounded via a resistor R10. The base is also connected to the cathode of a diode D2 of which anode is coupled via resistors R11 and R12 to the control voltage $V_{c1}$.

The interconnection between resistors R11 and R12 is connected to the output terminal of a comparator OP2. The non-inverting input terminal of comparator OP2 is connected to the input terminal $V_{in}$ of the level meter drive circuit 23, whereas the inverting input terminal thereof is connected to the interconnection of resistors R4 and R5 for supply of the reference voltage to comparator OP2.

The collector of transistor TR1 is supplied with the control voltage $V_{c1}$ via a resistor R13, and the emitter thereof is grounded. The interconnection between resistor R13 and transistor TR1 is connected to the base of another NPN transistor TR2.

The collector of transistor TR2 is connected via a resistor R14 to the inverting input terminal of an operational amplifier OP3. The non-inverting input terminal of the operational amplifier OP3 is connected to the interconnection between serial coupled resistors R15 and R16 which are connected across the control voltage $V_{c1}$ and ground terminals. The non-inverting terminal is thus supplied with a reference voltage. The output terminal of the operational amplifier OP3 is fed back to the inverting and non-inverting input terminals via respective resistors R17 and R18. A capacitor C4 is connected to the interconnection between the non-inverting input terminal and resistor R17. The operational amplifier OP3 constitutes a pulse generator so that it is called a pulse generator hereinafter in this specification.

When transistor TR2 turns on, a high (H) level signal is outputted from the output terminal of the operational amplifier OP3. When transistor TR2 turns off, H signal and L (low level) signals are alternately outputted in accordance with the result between the reference voltage inputted to the non-inverting terminal and the charge voltage of capacitor C4.

The output terminal of the pulse generator OP3 is connected to the base of a PNP transistor TR3 via a resistor R19. The emitter of transistor TR3 is supplied with the control voltage $V_{c1}$, and the collector thereof is grounded via an overload lamp 37 and resistor R20. The overload lamp 37 is mounted on the display unit 34.

The interconnection between the anode of the overload lamp 37 and the collector of transistor TR3 is connected to a diode D3 via a resistor R21. The cathode of diode D3 is connected to the alarm unit 17 (which is detailed later).

The base of an NPN transistor TR4 is connected to the control voltage $V_{c1}$ terminal via resistors R20 and R22, and the interconnection between R20 and R22 is connected to the output terminal of the pulse generator OP3. The collector of transistor TR4 is supplied with the control voltage $V_{c1}$ via resistors R23 and R24, and the emitter thereof is grounded.

The interconnection between resistors R23 and R24 is connected to the base of a PNP transistor TR5. The emitter of transistor TR5 is supplied with the control voltage $V_{c1}$, and the collector thereof is connected to the interconnection between resistors R2 and R3. When transistor TR5 turns on, the reference voltage applied to the reference voltage terminal $V_{ref}$ of the level meter drive circuit 23 rises to turn off LEDs 24 to 33, and when transistor TR5 turns off, LEDs 24 to 33 turn on again. Thus, the LEDs 24 to 33 turn on and off or flash depending upon the turning-on and -off of transistor TR5.

Structure of Oil Caution Unit 13

The oil caution unit 13 detects the lowering pressure of lubricating oil and displays an oil shortage condition.

Figures 3B, 3C:
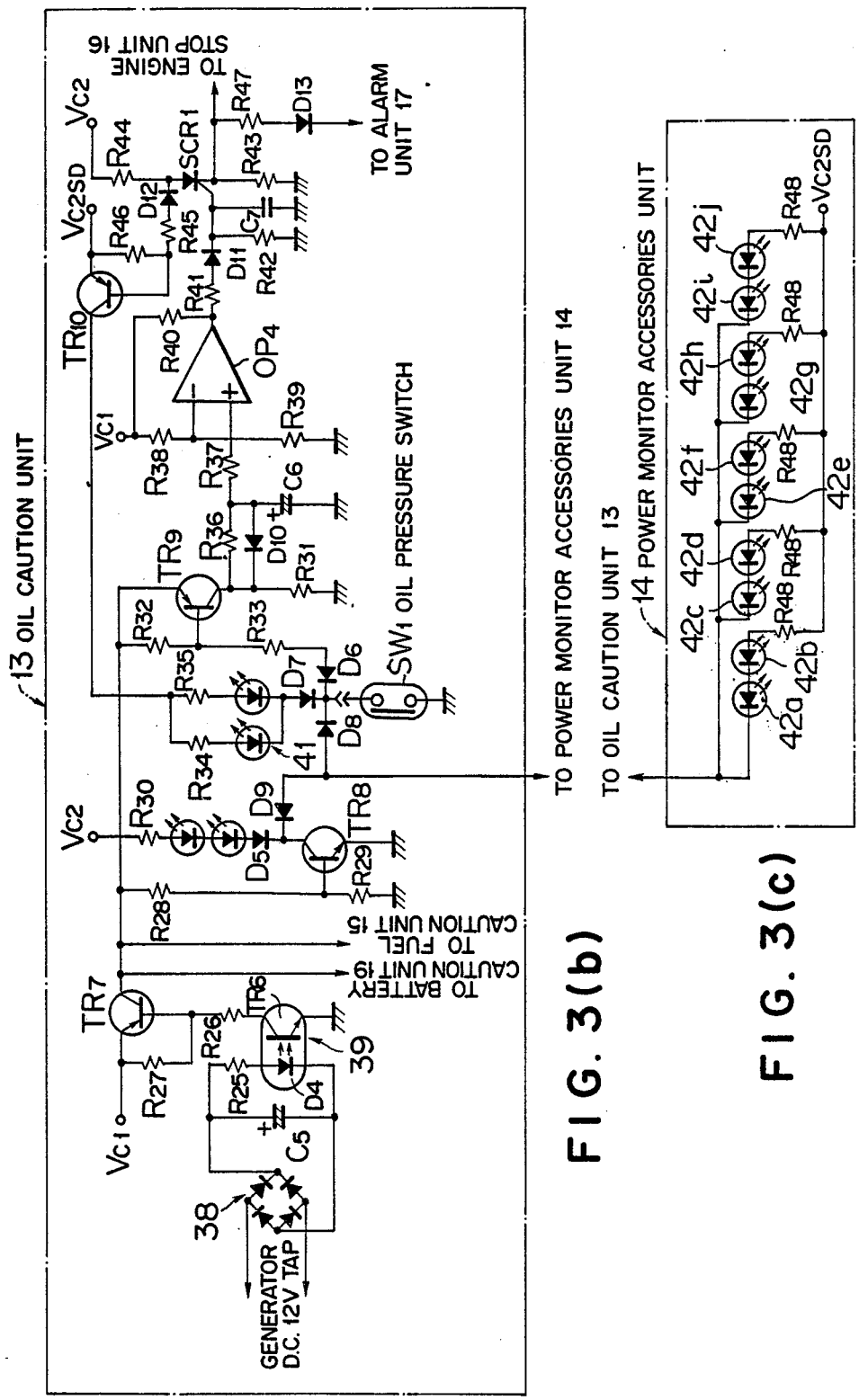
FIG. 3(b) is a circuit diagram of the oil caution unit.
FIG. 3(c) is a circuit diagram of the power monitor accessories unit.

As shown in FIG. 3(b), an AC power supplied from a battery charging tap (not shown) mounted on the engine driven generator is full-wave rectified by a rectifier 38 and smoothed by a capacitor C5 so that a voltage is applied across a light emitting diode D4 of a photocoupler 39 via a resistor R25.

The collector of a phototransistor TR6 of the photocoupler 39 is connected via a resistor R26 to the base of a PNP transistor TR7. The emitter of transistor TR7 is supplied with the control voltage $V_{c1}$ which is lower than the battery voltage. The emitter of transistor TR7 is connected via a resistor R27 to the base of this transistor. The collector thereof is connected to the fuel caution unit 15 and battery caution unit 19 (which will be detailed later).

The collector of transistor TR7 is connected to resistors R28 and R29 in series, and the interconnection between R28 and R29 is connected to the base of an NPN transistor TR8. The collector of transistor TR8 is connected to the cathode of a diode D5, the anode of which is supplied with a battery voltage $V_{c2}$ via an operation lamp 40 and resistor R30.

The collector of transistor TR7 is connected to the emitter of a PNP transistor TR9, the collector of which is grounded via a resistor R31. The base of transistor TR9 is connected to the collector of transistor TR7 and is also grounded via a resistor R33, diode D6 and oil pressure switch SW1.

The oil pressure switch SW1 turns off when the lubricating oil pressure rises high, and turns on when the generator stops or the lubricating oil pressure lowers.

The cathode of diode D6 is connected to the cathodes of other diodes D7 and D8. The anode of diode D7 is connected in parallel to two oil lamps 41 which are connected to the collector of a PNP transistor TR10 respectively via resistors R34 and R35.

The oil lamps 41 and the operation lamps 40 are mounted on the display unit 34 at the upper portion thereof.

The anode of diode D8 is connected to the power monitor accessories unit 14 (the structure of which will be detailed later), and is also connected to the anode of another diode D9 whose cathode is connected to the collector of transistor TR8.

The collector of transistor TR9 is connected via resistors R36 and R37 in series to the non-inverting terminal of a comparator OP4. The interconnection of resistors R36 and R37 is grounded via a capacitor C6. A diode D10 whose cathode is connected to the collector of transistor TR9 is connected in parallel with resistor R36.

The inverting input terminal of comparator OP4 is connected to the interconnection between resistors R38 and R39 in series which are connected across the control voltage $V_{c1}$ and ground terminals. The output terminal of comparator OP4 is supplied with the Control Voltage $V_{c1}$ via a resistor R40.

The output terminal of comparator OP4 is also connected via resistor R41 to the anode of a diode D11 of which cathode is connected to the gate of a thyristor SCR1. The interconnection between the cathode of diode D11 and the gate of thyristor SCR1 is grounded via parallel resistor R42 and capacitor C7.

The cathode of thyristor SCR1 is grounded via resistor R43, and the anode thereof is supplied with the battery voltage $V_{c2}$ via resistor R44.

The base of transistor TR10 is connected to the interconnection between resistor R44 and thyristor SCR1 via resistor R45 and diode D12 in series. The emitter of transistor TR10 is supplied with the voltage $V_{c2SD}$. The interconnection between the base of transistor TR10 and resistor R45 is connected to one end of a resistor R46 whose other end is supplied with the voltage $V_{c2SD}$.

The interconnection between the cathode of thyristor SCR1 and resistor R43 is connected to the engine stop unit 16 (the detailed structure will be described later), and to the alarm unit 17 via resistor R47 and diode D13 in series.

Structure of Power Monitor Accessories Unit 14

As shown in FIG. 3(c), the anodes of respective two light emitting diodes (LEDs) 42a to 42j are connected to the anode of diode D8 of the oil caution unit 13, and the cathodes thereof are supplied with the voltage $V_{c2SD}$ via resistor R48.

When the oil pressure switch of the oil caution unit 13 or the transistor 13 turns on, all the LEDs 42a to 42j turn on. Therefore, once the key switch turns on, the LEDs 42a to 42j continue to turn on until the engine stops.

The LEDs 42a to 42j are mounted, as shown in FIG. 2, on the display unit 34 at the lower portion thereof in the horizontal direction in one-to-one correspondence with the LEDs 24 to 33 of the overload caution unit 12. The LEDs 42a to 42j are used as the x-axis coordinates of the LEDs 24 to 33.

Structure of Fuel Caution Unit 15

The fuel caution unit 15 detects the shortage of remaining fuel and generates an alarm. It also forcibly stops the engine after a predetermined time lapse.

Figure 3D:
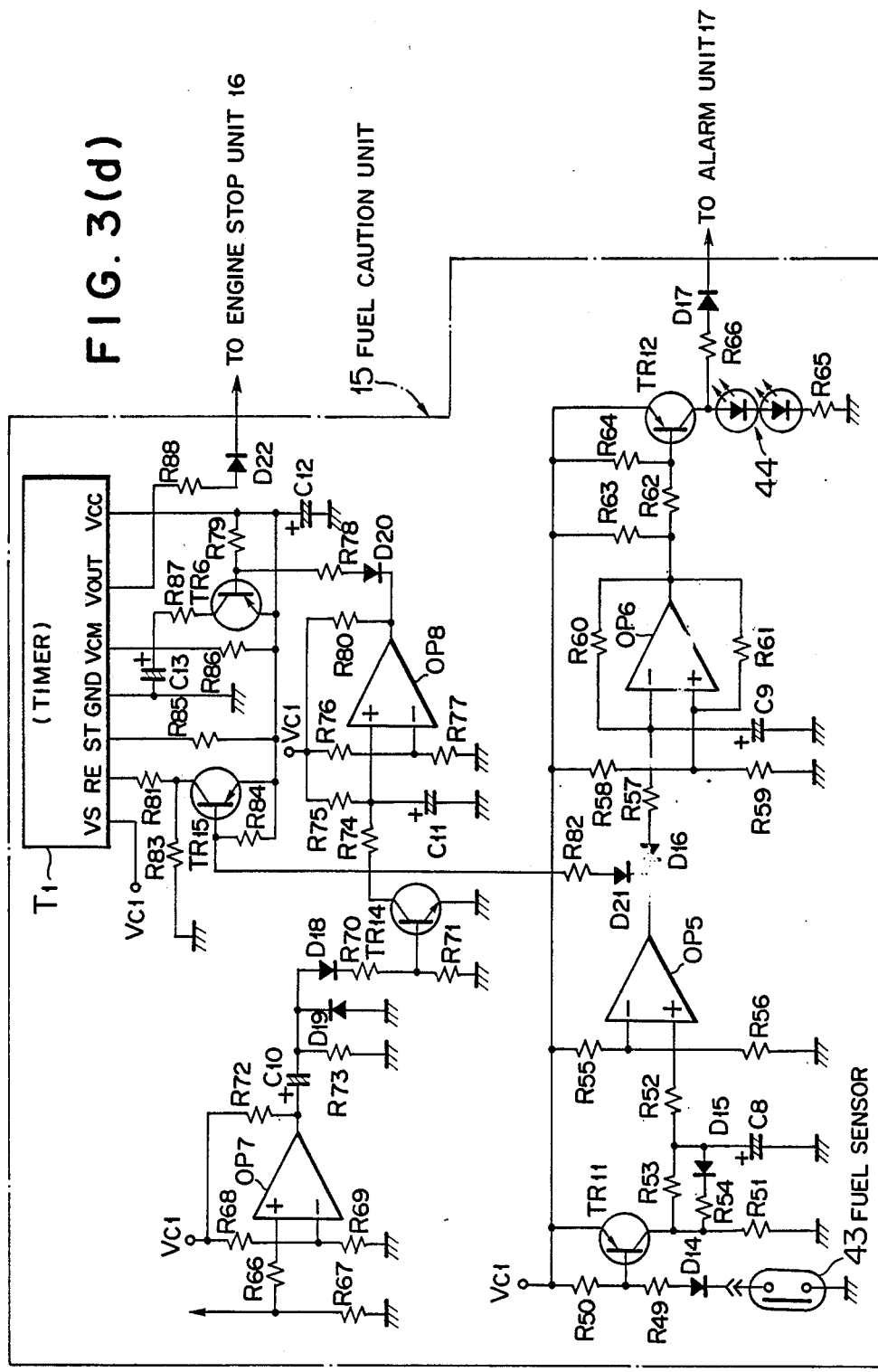
FIG. 3(d) is a circuit diagram of the fuel caution unit.

A fuel sensor 43 shown in FIG. 3(d) is mounted on a fuel tank (not shown) and causes a built-in lead switch to turn on when the remaining fuel in the fuel tank becomes less than a predetermined amount.

The fuel sensor 43 is connected to the cathode of a diode D14, and the anode thereof is supplied with the control voltage $V_{c1}$ via resistors R49 and R50. The interconnection between resistors R49 and R50 is connected to the base of a PNP transistor TR11. The emitter of transistor TR11 is supplied with the control voltage $V_{c1}$, and the collector thereof is grounded via a resistor R51.

The non-inverting input terminal of a comparator OP5 is connected via resistors R52 and R53 to the interconnection between the collector of transistor TR11 and resistor R51. The resistor R53 is connected in parallel with diode D15 and resistor R54 in series. The interconnection between resistors R52 and R53 is grounded via a capacitor C8.

The inverting input terminal of comparator OP5 is connected to the interconnection of resistors R55 and R56 in series which are connected across the control voltage $V_{c1}$ and ground terminals. The output terminal of comparator OP5 is connected to the cathode of a diode D16 of which anode is connected via a resistor R57 to the inverting input terminal of an operational amplifier OP6 (hereinafter called a pulse generator 6) functioning as a pulse generator.

The non-inverting input terminal of the pulse generator OP6 is connected to the interconnection between resistors R58 and R59 in series which are connected across the control voltage $V_{cl}$ and ground terminals. Therefore, a reference voltage obtained through division of the control voltage $V_{cl}$ is supplied to the non-inverting input terminal of the pulse generator. The output terminal of the pulse generator OP6 is fed back to the inverting input terminal and non-inverting input terminal via respective resistors R60 and R61. The inverting input terminal is grounded via a capacitor C9.

The output terminal of the pulse generator OP6 is also connected via a resistor R62 to the base of a PNP transistor TR12. The interconnection between the pulse generator OP6 and resistor R62 is supplied with the control voltage $V_{cl}$ via a resistor R63. The base of transistor TR12 is supplied with the control voltage via resistor R64.

The emitter of transistor TR12 is supplied with the control voltage $V_{cl}$, and the collector thereof is grounded via a fuel lamp 44 and resistor R65. The fuel lamp 44 is mounted on the display unit 34 of the engine driven generator (refer to FIG. 2).

When an H (high level) signal is outputted from the output terminal of comparator OP5, the capacitor C9 at the pulse generator OP6 is charged by the control voltage $V_{cl}$ via resistors R63 and R60. H and L (low level) signals are alternately outputted from the output terminal of the pulse generator OP6 in accordance with the comparison result between the reference voltage inputted to the non-inverting input terminal of the pulse generator OP6 and the charge voltage of capacitor C9, so that transistor TR12 repeats to turn on and off and hence the fuel lamp 44 flashes.

The interconnection between the collector of transistor TR12 and the fuel lamp 44 is connected via a resistor R66 to the anode of a diode D17. The cathode thereof is connected to the alarm unit 17 (the structure of which will be detailed later).

The interconnection between the collector of transistor TR7 of the oil caution unit 13 and the resistor R67, via which the collector is grounded, is connected to the non-inverting input terminal of a comparator OP7 via a resistor R66. The inverting input terminal of comparator OP7 is connected to the interconnection between resistors R68 and R69 in series which are connected across the control voltage $V_{cl}$ and ground terminals. The output terminal of comparator OP7 is connected to the anode of a diode D18 via a capacitor C10, and the cathode of diode D18 is grounded via resistors R70 and R71.

The interconnection between the output terminal of comparator OP7 nd capacitor C10 is supplied with the control voltage $V_{cl}$ via a resistor R72. The interconnection between diode D18 and capacitor C10 is grounded via parallel resistor R73 and diode D19. The anode of diode D19 is grounded.

The interconnection between resistors R70 and R71 is connected to the base of an NPN transistor TR14. The emitter of transistor TR14 is grounded, and the collector thereof is connected via resistor R74 to the noninverting input terminal of a comparator OP8.

The interconnection of resistor R74 and the noninverting input terminal of comparator OP8 is supplied with the control voltage $V_{cl}$ via resistor R75, and is grounded via a compacitor C11.

The inverting input terminal of comparator OP8 is connected to the interconnection of resistors R76 and R77 in series which are connected across the control voltage $V_{cl}$ and ground terminals. Thus, a reference voltage obtained through division of the control voltage $V_{cl}$ is supplied to the inverting input terminal.

The output terminal of comparator OP8 is connected to the cathode of a diode D20 whose anode is connected via a resistor R78 to the interconnection between the base of a PNP transistor TR6 and a resistor R79 connected to the base. The interconnection between the output terminal of comparator OP8 and diode D20 is supplied with the control voltage $V_{cl}$ via a resistor R80.

Reference character T1 represents a timer which counts a time lapse after the fuel lamp 44 flashes, and causes the engine to stop after a predetermined time lapse. The power supply terminal $V_s$ of the timer T1 is supplied with the control voltage $V_{cl}$.

The reset terminal RE of timer T1 is connected to the collector of a PNP transistor TR15 via a resistor R81. The base of transistor TR15 is connected to the anode of a diode D21 via a resistor R82, and the cathode thereof is connected to the interconnection between the output terminal of comparator OP5 and the cathode of diode D16. The interconnection between resistor R81 and the collector of transistor TR15 is grounded via a resistor R83.

The constant voltage terminal $V_{cc}$ of timer T1 is grounded via a capacitor C12. A control voltage inputted to the power supply terminal $V_s$ is stably outputted from the constant voltage terminal $V_{cc}$. The interconnection between the constant voltage terminal $V_{cc}$ and capacitor C12 is connected to one end of a resistor R84 of which the other end is connected to the base of transistor TR15.

The start terminal ST of timer T1 is connected via a resistor R85 to the interconnection between resistor R84 and capacitor C12. The clock puse input terminal $V_{CM}$ of timer T1 is connected via a resistor R86 to the interconnection between resistor R85 and capacitor C12. The clock pulse input terminal $V_{CM}$ is grounded via a capacitor C13.

The clock pulse input terminal $V_{CM}$ is also connected via a resistor R87 to the collector of transistor TR6 of which emitter is connected to the interconnection between resistor R85 and capacitor C12.

The resistance value of resistor R87 is larger than that of resistor R86 so that a signal supplied from transistor TR6 to the clock pulse input terminal $V_{CM}$ will not flow toward the resistor R86 side.

The output terminal $V_{out}$ of timer T1 is connected to the anode of a diode D22 via a resistor R88. The cathode of diode D22 is connected to the engine stop unit 16 (the detail of which will be described next).

Structure of Engine Stop Unit 16

The engine stop unit 16 causes the engine to stop, by throttling, in case of a diesel engine, the fuel injection pump or air suction passage in accordance with signals from the oil caution unit 13 and fuel caution unit 15.

Figure 3E:
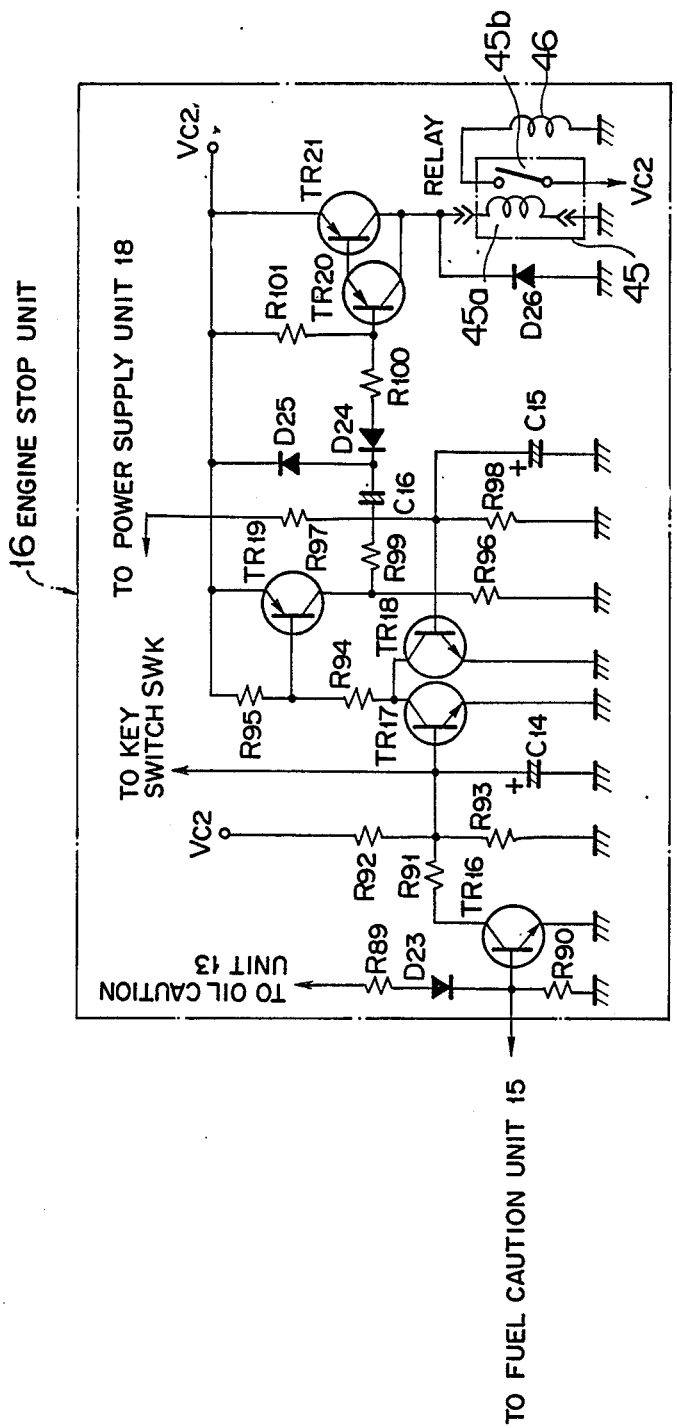
FIG. 3(e) is a circuit diagram of the engine stop unit.

As shown in FIG. 3(e), the anode of a diode D23 is connected via a resistor R89 to the interconnection of the cathode of thyristor SCR1 and resistor R43 of the oil caution unit 13. The cathode of diode D23 is grounded via a resistor R90. The interconnection between diode D23 and a resistor R90 is connected to the base of an NPN transistor TR16. The interconnection of the base of transistor TR16 and the cathode of diode D23 is connected to the cathode of the diode D22 of the fuel caution unit 15.

The emitter of transistor TR16 is grounded, and the collector thereof is connected via a resistor R91 to the base of another NPN transistor TR17. The interconnection between resistor R91 and the base of transistor TR17 is supplied with the battery voltage $V_{c2}$ via a resistor R92, and is grounded via parallel resistor R93 and Capacitor C14.

The base of transistor TR17 is connected to a key switch SWk which is grounded if OFF and opened if ON.

The emitter of transistor TR17 is grounded, and the collector thereof is supplied with the battery voltage $V_{c2}$ via resistors R94 and R95.

The interconnection between the collector of transistor TR17 and resistor R94 is connected to the collector of another NPN transistor TR18 of which emitter is grounded. The base of transistor TR18 is grounded via a capacitor C15.

The interconnection between resistors the R94 and R95 is connected to the base of a PNP transistor TR19 of which emitter is supplied with the battery voltage $V_{c2}$ and of which collector is grounded via a resistor R96. The interconnection between resistors R97 and R98 in series whch are connected to the power supply unit (the detail thereof will be described later) is connected to the interconnection between the base of transistor TR18 and capacitor C15.

The interconnection between the collector of transistor TR19 and resistor R96 is connected to the cathode of a diode D24 via a resistor R99 and a capacitor C16.

The anode of diode D24 is connected via a resistor R100 to the base of a PNP transistor TR20 and Darlington-connected to another PNP transistor TR21, the emitter thereof is connected to the base of transistor TR21, and the collector thereof is connected to the collector of transistor TR21. The emitter of transistor TR21 is supplied with the voltage $V_{c2SD}$.

The interconnection between capacitor C16 and diode D24 is connected to the anode of another diode D25 of which cathode is supplied with the battery voltage $V_{c2}$. The interconnection between the base of transistor TR20 and resistor R100 is supplied with the battery voltage $V_{c2}$ via a resistor R101.

The collector of transistor TR21 is connected to an exciting coil 45a of a relay 45. One of the contacts 45b of the relay is supplied with the battery voltage $V_{c2}$, and the other is connected to one end of a winding of an actuator 46 the other end of which is grounded. The interconnection between the excitation coil 45a of relay 45 and the collector of transistor TR21 is connected to the cathode of a diode D26 whose anode is grounded.

Figure 5:
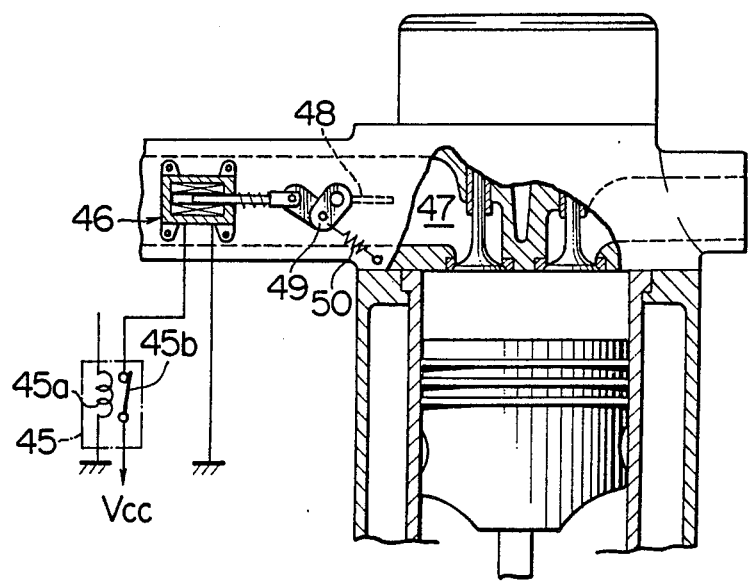
FIGS. 5 and 6 are partially broken sectional front views illustrating the engine stop mechanism.
Figure 6:
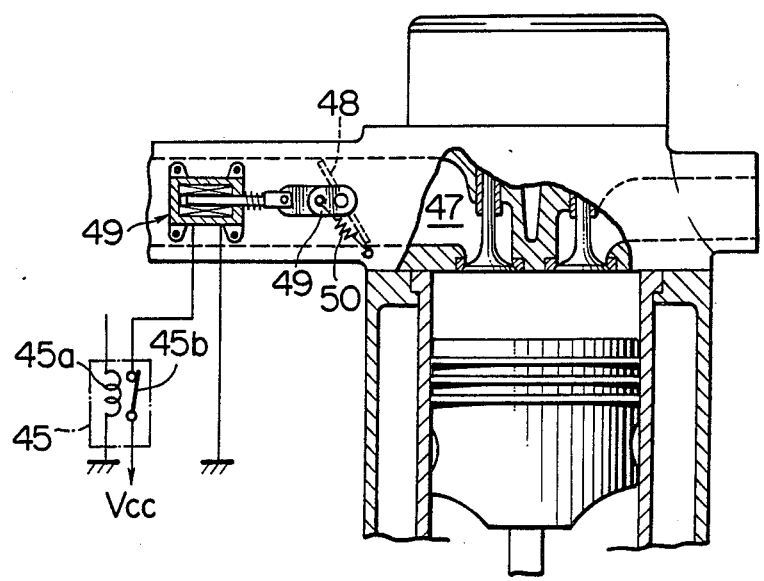

The actuator 46 operates to stop the engine by limiting the amount of induced air in the following manner. As shown in FIGS. 5 and 6, a lever 49 coupled to a valve 48 of an air suction passage 47 is rotated against the force of a spring 50 to close the air suction passage.

Figure 7:
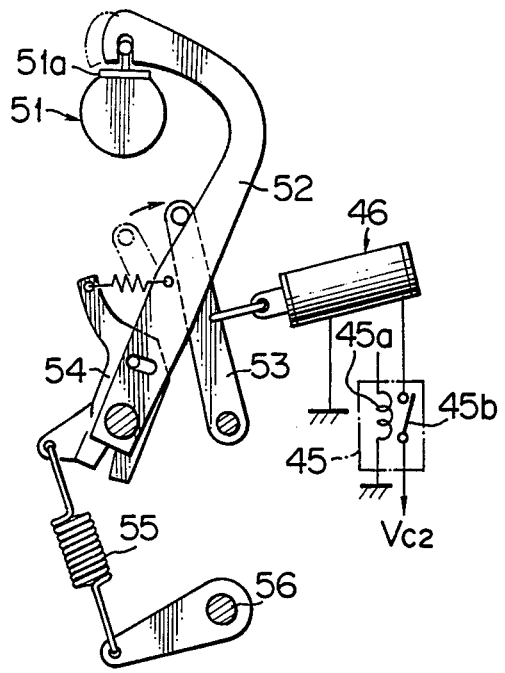
FIG. 7 is a schematic side view illustrating another engine stop mechanism.

Alternatively, in order to stop the engine by throttling the fuel injection amount, for example as shown in FIG. 7, the actuator 46 may be coupled to a stop lever 53 for throttling the amount of fuel from the fuel injection pump 51 by forcibly rotating a governor lever 52 operating upon a control rack 51a of a fuel injection pump 51, in the clockwise direction as seen in the drawing. The governor 52 is coupled to a governor shaft 56 via a control lever 54 and a governor spring 55.

Structure of Alarm Unit 17

The alarm unit 17 generates an alarm in accordance with signals from the overload caution unit 12, oil caution unit 13 and fuel caution unit 15.

Figure 3F:
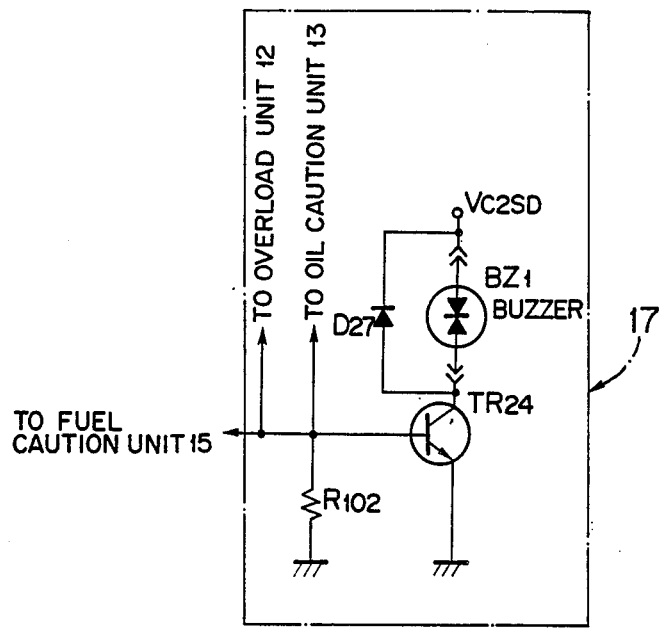
FIG. 3(f) is a circuit diagram of the alarm unit.
Figure 3I:
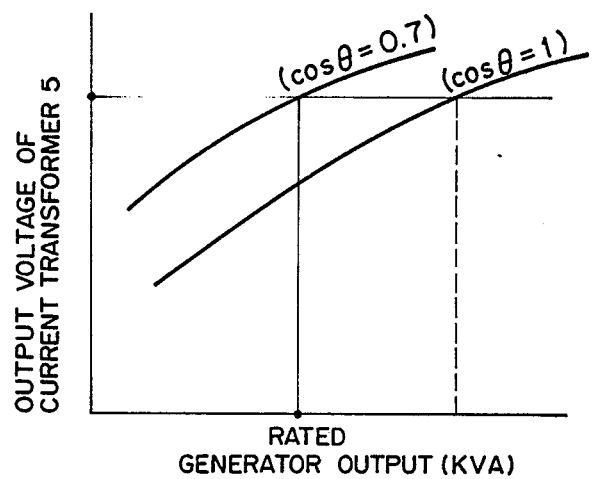
FIG. 3(i) is a graph showing the relationship between an output voltage of current transformer 5 and generator output power.

As shown in FIG. 3(f), the base of an NPN transistor TR24 of the alarm unit 17 is connected to the cathode of diode 17 of tthe fuel caution unit 15. The interconnection between the base of transistor TR24 and the cathode of diode D17 is connected to the cathode of diode D3 of the overload caution unit 12 and to the cathode of diode D13 of the oil caution unit 13. The interconnection between diodes D17 and D13 is grounded via a resistor R102.

The emitter of transistor TR24 is grounded, and the collector thereof is supplied with the voltage $V_{c2SD}$ via a buzzer BZ1 which is one example of alarm means. A diode D27 of which anode is connected to the collector of transistor TR24 is connected in parallel with the buzzer BZ1.

Structure of Power Supply Unit 18

The power supply unit 18 supplies the voltage $V_{c2SD}$ generated from the battery voltage $V_{c2}$ to various control units. The power supply unit also has a stabilized power supply circuit $V_c$ for generating the control voltage $V_{c1}$.

Figure 3G:
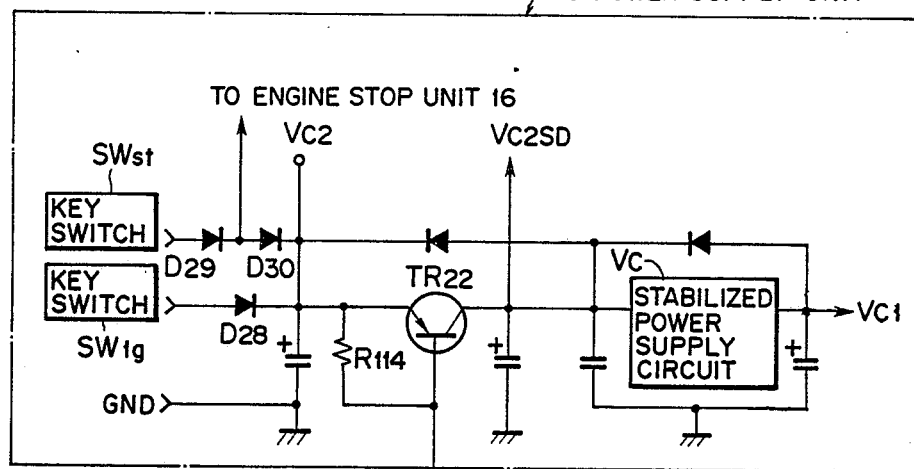
FIG. 3(g) is a circuit diagram of the power supply unit.

As shown in FIG. 3(g), the battery voltage $V_{c2}$ is supplied to the emitter of a PNP transistor TR22. The emitter of transistor TR is connected via a diode D28 to a key switch SWig connected to the ignition system. The collector of transistor TR22 is connected to the stabilized power supply circuit $V_c$ which generates the control voltage $V_{c1}$ to supply it to the control units. The voltage $V_{c2SD}$ is supplied from the interconnection between the collector of transistor TR22 and the stabilized power supply circuit $V_c$.

The base of transistor TR22 is connected to the battery caution unit 19 (the structure of which will be detailed next).

A key switch connected to a starter is connected via diodes D29 and D30 to the emitter of transistor TR22. The interconnection between diodes D29 and D30 is connected to one end of resistor R97 of the engine stop unit 16.

Structure of Battery Caution Unit 19

The battery caution unit 19 detects the level of electrolyte and its specific gravity, and when they become less than predetermined values, causes to forcibly stop the power supply from the power supply unit 18 to the control units.

Figure 3H:
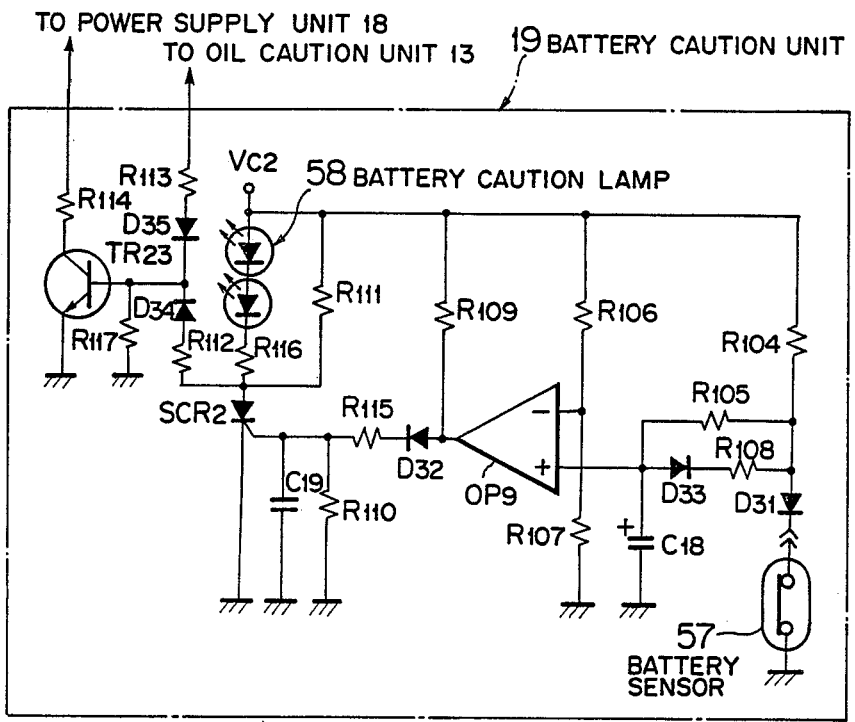
FIG. 3(h) is a circuit diagram of the battery caution unit.

As shown in FIG. 3(h), a battery sensor 57 mounted on a battery (not shown) of the float type detects the level and specific gravity, and turns off when the surface level or the specific gravity becomes less than the respective predetermined values.

The battery sensor 57 is supplied with the voltage $V_{c2}$ via a diode D31 and a resistor R104. The interconnection between diode D31 and resistor R104 is grounded via a capacitor C18.

A battery caution lamp 58, resistor R116 and thyristor SCR2 are connected across the voltage $V_{c1}$ and ground terminals. The gate of thyristor SCR2 is connected via a resistor R115 and a diode D32 to the output terminal of a comparator OP9.

The inverting input terminal of comparator OP9 is connected to the interconnection between resistors R106 and R107 in series which are connected across the voltage $V_{c2}$ and ground terminals. The non-inverting input terminal of comparator OP9 is connected to the anode of a diode D33 whose cathode is connected via a resistor R108 to the anode of diode D31. The interconnection between resistor R105 and capacitor C18 is connected to the noninverting input terminal of comparator OP9.

The output terminal of comparator OP9 is supplied with the voltage $V_{c2}$ via a resistor R109. The interconnection between resistor R115 and thyristor SCR2 is grounded via parallel resistor R110 and capacitor C19.

The interconnection between resistor R106 and the anode of thyristor SCR2 is supplied with the voltage $V_{c2}$ via a resistor R111, and is connected via a resistor R112 to the anode of a diode D34. The cathode thereof is connected to the cathode of another diode D35 of which anode is connected via a resistor R113 to the collector of transistor TR7 of the oil caution unit 13 (FIG. 3(b)).

The interconnection between diodes D34 and D35 is connected to the base of an NPN transistor TR23, the base being grounded via a resistor R117. The emitter thereof is grounded, and the collector is connected to the base of transistor TR22 of the power supply unit 18.

Next, the operation of the embodiment constructed as above will be described.

Operation of Overload Caution Unit 12

Normal Operation

As the engine starts, an AC voltage which is proportional to an AC current in dependence on the load is induced across the current transformer 3 provided for the main winding 2. The induced AC voltage is full-wave rectified by the rectifier 20 and smoothed by the smoothing circuit 21 for supply to the input terminal $V_{in}$ of the level meter drive circuit 23.

During a normal operation without overload condition, the voltage picked up by the current transformer 5 provided for the condenser winding 4 is smaller than the reference voltage of comparator OP1 so that the comparator OP1 always outputs an L signal, thus causing transistor TR1 to turn off and transistor TR2 to turn on. As a result, the pulse generator OP3 always outputs an H signal.

Consequently, transistor TR3 turns off and the overload lamp is maintained as turned off. On the other hand, transistors TR4 and TR5 turn on. The reference voltage terminal $V_{ref}$ of the level meter drive circuit 23 is supplied with the control voltage $V_{c1}$ as the reference voltage via transistor TR5 and resistors R3 to R5. The level meter drive circuit 23 compares the reference voltage inputted through the reference voltage terminal $V_{ref}$ with the voltage inputted to the input terminal $V_{in}$, and in accordance with the result the LEDs 24 to 33 are sequentially turned on from the lowest LED to the highest LED shown in FIG. 2 with increasing number of turned-on LEDs to thereby notify an operator of the present output power as well as of the remaining output power up to the maximum power output.

Overload Detection by Current Transformer 3

The voltage applied to the input terminal of the level meter drive circuit 23 is supplied to the noninverting input terminal of comparator OP2. The reference voltage inputted to the inverting input terminal of comparator OP2 is designated herein by $V_{00}$, which is given by:

$$V_{00} = [(Ra + Rcc + R5) / (Ra + Rcc + R5 + R4 + R39] \times V_{c1}$$

where Rcc is the internal resistance of the level meter drive circuit 23.

The reference voltage $V_{00}$ is set larger than the reference voltage inputted to the reference voltage terminal $V_{ref}$ of the level meter drive circuit 23, by the amount corresponding to resistor R5. When an overload condition occurs where the current transformer 3 supplies a voltage larger than a voltage which causes all the LEDs 24 to 33 to turn on, an H signal is outputted from the output terminal of comparator OP2.

Consequently, the NPN transistor TR1 turns on whereas the NPN transistor TR2 turns off. Then, the H signal outputted from the output terminal of the pulse generator OP3 is fed back via resistor R17 so that capacitor C4 is charged. When the charging voltage of capacitor C4 becomes higher than the reference voltage inputted to the non-inverting input terminal of the pulse generator OP3, an L signal is outputted from the output terminal of the pulse generator OP3.

The output signal of the pulse generator OP3 is supplied to the bases of NPN transistors TR3 and TR4.

The transistor TR3 turns on and off in response to the L and H signals from the pulse generator OP3, to thereby turn on and off or flash the overload lamp 37 mounted on the display unit 34 (shown in FIG. 2) of the engine driven generator.

As the transistor TR4 turns on and off in response to the H and L signals from the pulse generator OP3, the transistor TR5 also turns on and off. When the transistor TR5 turns off, the reference voltage $V_{00}$ to the level meter drive circuit 23 is lowered because of presence of resistor R2, so that all the LEDs 24 to 33 turn on and there is no change.

While the overload lamp 37 flashes, the buzzer BZ1 of the alarm unit 17 (FIG. 3(f)) generates alarm sounds at the same time.

Overload Detection by Current Transformer 5

As described above, comparator OP2 outputs H and L signals by detecting only the current flowing through the main winding 2 so that it outputs an L signal even under the overload condition with high power factor $\cos\theta$ (refer to FIG. 8).

An excitation current corresponding to the load of the generator flows through the condenser winding 4 of the excitation circuit. Therefore, an AC voltage picked up by the current transformer provided for the condenser winding 4 matches the actual load condition of the generator.

The AC voltage picked up by the current transformer 5 is full-wave rectified by the rectifier 35 and smoothed by the smoothing circuit 36 for supply to the noninverting terminal of comparator OP1. The inverting input terminal of comparator OP1 is supplied with the reference voltage obtained by dividing the control voltage $V_{c1}$ by resistors R7 and R8. Thus, during an overload condition, the comparator OP1 outputs an H signal.

In response to the H signal, the transistor TR1 turns on so that in the similar manner as above, the pulse generator OP3 outputs drive pulses to flash the overload lamp 37 and generate intermittent sounds from the buzzer BZ1. The transistors TR4 and TR5 also turn on and off.

While the transistor TR5 turns off, the reference voltage terminal $V_{ref}$ of the level meter drive circuit 23 is supplied with a low reference voltage via resistors R2 to R5. Therefore, all the LEDs 24 to 33 turn on. On the other hand, while the transistor TR5 turns on, the reference voltage terminal $V_{ref}$ is supplied with the reference voltage of a normal set value so that only those LEDs which are operable in accordance with the voltage outputted from the current transformer 3 turn on.

As a result, even if an actual output voltage is low by the influence of the power factor during an overload condition and some LEDs turn on, the remaining LEDs flash so that it is possible to notify the operator of the fact that the engine has only small remaining output power.

According to the present invention, based on the relationship between the output voltage from the current transformer 5 and the generator output power, an overload condition is detected by comparing an output voltage corresponding to the rated output power with the reference voltage supplied to the non-inverting input terminal of comparator OP1. However, if the predetermined reference voltage is set for the power factor $\cos\theta = 0.7$ as an example, a voltage obtained under the larger power factor cannot be detected as an overload condition because the voltage may actually take a value smaller than that of the reference voltage.

In view of this, an overload is detected by the current transformer 5 of the load detection means B in case of a poor power factor, and by the current transformer 4 of the load detection means A in case of a good power factor.

Operation of Oil Caution Unit 13

With Sufficient Oil

As the engine starts, a current supplied from the battery charging tap of the generator is full-wave rectified by the rectifier 38 and smoothed by capacitor C5 for supply the power to the photodiode D4 of photocoupler 39.

Then, the NPN transistor TR6 of photocoupler 39 turns on, and PNP transistor TR7 turns on so that the voltage $V_{c1}$ is supplied to resistors R28 and R29 and hence to the base of NPN transistor TR8 to turn on it.

Then, the battery voltage $V_{c2}$ is supplied to the operation lamp 40 to turn it on.

The oil pressure switch SW1 turns on while the engine stops, and turns off as the oil pressure rises.

The oil lamp 41 does not turn on during the engine stop. The reason for this is as follows. Since the transistor TR7 is maintained turned off during the engine stop, a voltage to transistor TR9 is not supplied and the voltage at the inverting input terminal of comparator OP4 is lower than the reference voltage at the non-inverting input terminal thereof, so that comparator OP4 outputs an L signal and the thyristor SCR1 turns off. Therefore, the transistor TR10 cannot be turned on but it turns off so that the current to the oil lamp 41 is stopped.

Shortage of Oil

If the oil amount is insufficient, the oil pressure gradually lowers so that the oil pressure switch SW1 turns off. Then, a base current flows through the base of PNP transistor TR9 to turn it on. A voltage from transistor TR9 is supplied to the non-inverting input terminal of comparator OP4 via a time constant circuit constructed of resistor R36, capacitor C6, etc.

Repetitive turning on and off of the oil pressure switch SW1 due to variation of oil pressure can be eliminated by the time constant circuit so that an erroneous operation can be eliminated.

When a voltage supplied to the non-inverting input terminal of comparator OP4 exceeds the reference voltage supplied to the inverting input terminal thereof, an H signal is outputted from the output terminal thereof, and supplied to the gate of thyristor SCR1 to turn it on.

Then, the PNP transistor TR10 turns on to make the oil lamp 41 turn on. At the same time, an engine stop signal is outputted from thyristor SCR1 to the engine stop unit 16, and an alarm signal is outputted to the alarm unit 17.

Operation of Power Accessories Unit 14

During the engine stop, the oil pressure switch SW1 of the oil caution unit 13 is maintained turned on so that if the key switch turns on, all the LEDs 42a to 42j turn on. After the engine starts, even if the oil pressure switch SW1 turns off, the LEDs 42a to 42j continue to turn on because the transistor TR8 remains turned on.

This causes a relatively large current to flow into the oil pressure switch SW1, which satisfies a requirement of a minimium current of 50 to 100 microampere as the open/close current for a commonly used oil pressure switch SW1.

The LEDs 42a to 42j being turned on are positively utilized as the x-axis of the LEDs 24 to 33 of the overload caution unit 12 in checking the load level.

Operation of Fuel Caution Unit 15

With Sufficient Fuel

While the fuel is stored in the fuel tank more than a predetermined amount, the float type fuel sensor 43 in the fuel tank turns off so that the PNP transistor TR11 turns off. Therefore, an L signal is outputted from comparator OP5 to turn on PNP transistor TR5. In this case, the pulse generator OP6 outputs an H signal.

Upon turning-on of transistor TR5, a reset signal from the voltage terminal $V_{cc}$ of timer T1 is inputted to the reset terminal RE so that timer T1 is maintained in non-operation condition.

While the H signal is outputted from the pulse generator OP6, PNP transistor TR12 maintains turned on so that the fuel lamp 44 and the alarm unit 17 are maintained in non-operation condition.

Shortage of Fuel

When the fuel stored in the fuel tank becomes insufficient, the float type fuel sensor 43 turns on so that the PNP transistor TR11 turns on to start charging capacitor C8. Even if the fuel sensor repeats to turn on and off due to variation of the surface level of the fuel, this variation is eliminated by the discharge time of capacitor C8 to thus eliminate an erroneous operation of comparator OP5.

When the reference voltage supplied to the inverting input terminal of comparator OP5 becomes higher than the voltage supplied to the non-inverting input terminal thereof, the output terminal of comparator OP5 becomes off-state (open collector).

Then, drive pulses are outputted from the pulse generator OP6 so that the transistor TR12 repeats to turn on and off to make the fuel lamp 44 mounted on the display unit 34 flash. In addition, the NPN transistor TR24 of the alarm unit 17 repeats to turn on and off to generate intermittent sounds from the buzzer BZ1 and notify the operator of the shortage of fuel.

At the same time, as an H signal is outputted from comparator OP5, transistor TR15 turns off so that the start terminal ST of timer T1 is supplied with a start signal to start counting clock pulses inputted to the clock pulse input terminal $V_{CM}$. The clock pulses are generated based on the charge/discharge of an voltage applied to capacitor C13 via resistor R86. Timer T1 counts the clock pulses, and after it has counted a predetermined number of pulses, i.e., after a predetermined time has lapsed, an engine stop signal is outputted from the output terminal $V_{out}$ to the engine stop unit 16.

Restart from Fuel Shortage

Upon engine restart, transistor TR7 of the oil caution unit 13 turns on so that a voltage which is larger than the reference voltage is applied to the noninverting terminal of comparator OP7 of the fuel caution unit 15. Then, a differential signal is supplied from the output terminal of comparator OP7 to the base of NPN transistor TR14 to turn it on for a predetermined time period and output an L signal from comparator OP8.

As a result, PNP transistor TR6 of the timer T1 side turns on so that a voltage from the voltage terminal $V_{cc}$ is charged to capacitor C13 via resistor R87 having a smaller value than that at resistor R86.

The interval of clock pulses inputted to the clock pulse input terminal $V_{CM}$ from capacitor C13 becomes short as the resistance becomes small. The lapse time after the count start becomes accordingly short so that the engine stop signal is outputted from the output terminal $V_{out}$ after a short time lapse.

Fuel Supply during Operation

If fuel is supplied during the engine operation, the fuel sensor 43 turns off and transistor TR5 turns on so that a reset signal is supplied to the reset terminal RE of timer T1 to disable it, whereby the engine operation automatically returns to the normal operation.

Operation of Engine Stop Unit 16

Normal Operation

If the key switch SWk is kept turned off, it is grounded. On the other hand, if the key switch SWk is on, the battery voltage $V_{c2}$ is supplied to the base of NPN transistor TR17 via resistor R92 to turn it on so that PNP transistor TR19 turns on.

As a result, the Darlington-connected transistor TR20 turns off.

Engine Stop Operation

If the key switch SWk turns off from the normal operation, transistor TR17 turns off and the battery voltage $V_{c2}$ is supplied from transistors TR21 and TR20, resistor R100, diode D24 and capacitor C16, to resistors R99 and R96. Therefore, the base current flows through the Darlington-connected transistors TR20 and TR21 to turn them on.

Then, the exciting coil 45 of the relay 45 is energized to turn on the contact 45b. As a result, the actuator 46 connected to the contact 45b causes the engine to stop.

As the means for stopping the engine, various arrangements may be used, such as that shown in FIGS. 5 and 6 wherein the air suction passage 47 is closed by the valve 48, that is shown in FIG. 7 wherein the governor lever 52 coupled to the control rack 51a of the fuel injection pump 51 is forcibly rotated in the direction to throttle the fuel supply amount, and other arrangements. In case where the valve 48 is used to close the air suction passage 47, the actuator 46 may directly rotate the valve 48.

Capacitor C16 is gradually charged to raise the voltage thereacross. When the charge voltage becomes substantially equal to the supply voltage, transistor TR20 turns off and the relay 45 also turns off so that power supply to the actuator 46 is automatically stopped.

In order to stop the engine, the amount of induced air or the amount of supplied fuel is limited for several seconds until the engine inertia diminishes. Therefore, the value presently used of capacitor C16 may suffice such control.

Immediate Engine Stop

Upon supply of an engine stop signal (H signal) from the oil caution unit 13 or fuel caution unit 15 to the base of NPN transistor TR16 of the engine stop unit 16, transistor TR17 turns off to immediately and forcibly stop the engine in the similar manner as the case of manual stop described above.

As a result, if the engine stop signal is from the oil caution unit 13, an engine seizure can be avoided. Alternatively, if the engine stop signal is from the fuel caution unit 15, inducing air into the fuel injection pump due to the fuel shortage can be prevented.

Restart Operation

If the starter switch SWst of the key switch SWk (refer to FIG. 3(g)) is turned on after the immediate engine stop, a voltage from the starter switch SWst is applied via resistor R97 to the base of NPN transistor TR18 to turn it on. Then, PNP transistor TR19 turns on so that the voltage charged across capacitor C16 is discharged via transistor TR19.

As a result, the voltage charged in capacitor C16 during the immediate engine stop operation is discharged by all means at the restart operation to prepare the next engine stop operation.

Operation of Alarm Unit 17

Upon input of an alarm signal (H signal) from the overload caution unit 12, oil caution unit 13, and fuel caution unit 15 to the base of NPN transistor TR24 of the alarm unit 17, this transistor TR24 turns on and the buzzer BZ1 generates intermittent sounds to notify the operator.

Operation of Power Supply Unit 18 and Battery Caution Unit 19

If the level of battery electrolyte and specific gravity are greater than the predetermined values, the battery sensor 57 on the battery turns off so that the battery voltage $V_{c2}$ is applied across resistor R104 and ground.

The battery voltage $V_{c2}$ is also applied across resistors R111 and R112 to the base of NPN transistor TR23 to turn it on. Therefore, PNP transistor TR22 of the power supply unit 18 coupled to transistor TR23 is also caused to turn on, thus supplying the control voltage $V_{c1}$ and the constant voltage $V_{c2SD}$ to the control units.

Alternatively, if the level of battery electrode and specific gravity becomes smaller than the predetermined values because of discharging of the battery, the battery sensor 57 turns off to make capacitor C18 start charging via resistors R104 and R105 from the battery voltage $V_{c2}$. The charge voltage of capacitor C18 is applied to the non-inverting terminal of comparator OP9. When the charge voltage exceeds the reference voltage applied to the inverting terminal, an H signal is outputted from comparator OP9 to the gate of thyristor SCR2 to turn it on.

Then, the battery voltage $V_{c2}$ is supplied to the battery caution lamp 58 to turn it on and to give the alarm for the shortage of battery capacity to the operator. At the same time, transistor TR23 turns off so that a power supply stop (H) signal is applied via resistor R114 to transistor TR22 to turn it off.

As a result, the voltage $V_{c2SD}$ supplied to the key switch SWk and the control voltage $V_{c1}$ are prevented from being supplied to all the control units including the overload caution unit 12, power monitor unit 14, alarm unit 18, etc. which receive the power via the key switch SWk and control voltage $V_{c1}$. Thus, the control unit system stops its operation. Although the battery caution lamp 58 continues to turn on, the consumed power by the lamp is small so that there is no fear of excessive consumption of the battery capacity.

Therefore, the minimum battery capacity necessary for the restart can be ensured.

The present invention is also applicable to a gasoline engine. In such a case, the engine stop unit 16 may be arranged to operate to ground the primary or secondary winding of the ignition coil upon receiving the engine stop signal.

As appreciated from the foregoing description of this invention, a timer is provided at the fuel caution unit, which timer starts operating upon receiving a fuel shortage signal and outputs an engine stop signal to the engine stop unit after the lapse of the timer limit time, and on the other hand for the restart operation, immediately outputs an engine stop signal to the engine stop unit. Further, the fuel caution unit is connected to the alarm unit which generates an alarm horn so that when a fuel shortage is detected, the operator can be notified of such effect. If fuel is not supplied, the engine is forcibly stopped after a predetermined time lapse. Therefore, in case of a diesel engine, inducing air into the fuel injection pump can be avoided, whereas in case of a gasoline engine, deterioration of exhaust gas constituents can be avoided. Furthermore, if the engine is made to restart after the fuel shortage, the engine is immediately stopped to thereby avoid inducing air into the fuel injection pump and deterioration of exhaust gas constituents. Thus, the present invention allows various advantageous effects.

What is claimed is:

1. A fuel shortage detection system for an engine driven generator comprising:
    means for detecting a fuel shortage condition depending on measuring of the level of fuel in a fuel tank and for producing a level signal;
    alarm means responsive to said signal from said detection means for generating an alarm;
    timer means for providing time lapse signal when said signal from said detection means lasts for a predetermined time;
    restart detection means for detecting that said engine is caused to restart and for providing a restart signal;
    output means responsive to said signal from said restart means for outputting a signal after a time lapse shorter than said predetermined time lapse; and
    engine stop means responsive to said signal from said timer means and said output means for stopping said engine.

2. A fuel shortage detection system for an engine driven generator according to claim 1, further comprising:
    current detection means for detecting a value of a load current of said generator; and
    overload detection means for detecting an overload condition based on that the detected current value by said current detection means is larger than a predetermined value;
    wherein the detected signal by said overload detection means is supplied to said alarm means.

3. A fuel shortage detection system for an engine driven generator according to claim 2, further comprising:
    display means for displaying the magnitude of the detected current value by said current detection means, by changing the number of a plurality of display elements to be turned on.

4. A fuel shortage detection system for an engine driven generator according to claim 3, wherein
    said current detection means comprises:
    first current detection means for detecting an output current of a main winding of said generator; and
    second current detection means for detecting a value corresponding to an overload condition of said generator based on a current of an excitation winding of said generator; and
    said display means is adapted to change the number of a plurality of display elements to be turned on in accordance with the detected signal by said first current detection means, and in response to an output from said second current detection, adapted to turn on said display elements corresponding in number to said value corresponding to said overload condition.

5. A fuel shortage detection system for an engine driven generator according to claim 3, wherein said display means comprises in addition to said plurality of display elements, an auxiliary display element group disposed in an array for recognizing the display level of said plurality of display elements.

6. A fuel shortage detection system for an engine driven generator according to claim 1, further comprising:
    oil pressure lowering detection means for measuring an oil pressure of said engine and detecting that said measured oil pressure becomes lower than a predetermined value, wherein the detected signal by said oil pressure lowering detection means is supplied to said alarm means and said engine stop means.

7. A fuel shortage detection system for an engine driven generator according to claim 1, further comprising:
    a battery for supplying a power to said fuel shortage detection system; and
    battery detection means for detecting that the surface level and specific gravity of electrolyte of said battery become smaller than predetermined values, the output from said battery detection means being adapted to be supplied to said alarm means.

* * * * *